United States Patent
Moscaret et al.

(10) Patent No.: US 7,163,209 B2
(45) Date of Patent: Jan. 16, 2007

(54) SNAP-ON SKI ATTACHMENT WITH BRAKE FOR KICK SCOOTER

(76) Inventors: Kennth Moscaret, 2240 275th Ct., SE., Sammamish, WA (US) 98075; Roger Moore, 2238 273rd Ct., SE., Sammamish, WA (US) 98075; Gene Arnold VanPelt, II, 7028 - 191st Pl. SW., Lynnwood, WA (US) 98036; David Dennis Nelson, 960-1 St., Idaho Falls, ID (US) 83402; Robert L. Gille, P.O. Box 360, Brightwood, OR (US) 97011

( * ) Notice: Subject to any disclaimer, the term of this patent is extended or adjusted under 35 U.S.C. 154(b) by 0 days.

(21) Appl. No.: 11/329,321

(22) Filed: Jan. 9, 2006

(65) Prior Publication Data

US 2006/0108750 A1    May 25, 2006

Related U.S. Application Data

(63) Continuation-in-part of application No. 09/970,381, filed on Oct. 2, 2001, now abandoned.

(60) Provisional application No. 60/237,225, filed on Oct. 2, 2000.

(51) Int. Cl.
   *B62B 13/18*    (2006.01)
(52) U.S. Cl. .................. 280/8; 280/7.12; 280/7.14; 280/14.28
(58) Field of Classification Search ............... 280/7.12, 280/14.25, 14.28, 14.21, 14.27, 26, 7.14, 280/8, 87.05, 87.041
   See application file for complete search history.

(56) References Cited

U.S. PATENT DOCUMENTS

| 573,034 | A |   | 12/1896 | Peterson |
| 613,940 | A |   | 11/1898 | Ringborg |
| 1,524,850 | A |   | 2/1925 | Van Daam |
| 1,745,643 | A | * | 2/1930 | Roessel ............... 280/7.12 |
| 3,179,433 | A | * | 4/1965 | Flack .................... 280/8 |
| 3,630,301 | A | * | 12/1971 | Henricks ............... 180/183 |
| 4,161,323 | A | * | 7/1979 | Wetteland ............. 280/7.12 |
| 4,778,190 | A | * | 10/1988 | Meredith .............. 280/7.12 |
| 5,427,390 | A | * | 6/1995 | Duncan et al. ........... 280/8 |
| 5,531,462 | A | * | 7/1996 | Gu .................... 280/7.13 |
| 6,139,031 | A |   | 10/2000 | Wingard |
| 6,139,035 | A |   | 10/2000 | Tsai |
| D460,137 | S | * | 7/2002 | Burger ................ D21/767 |
| 6,474,660 | B1 | * | 11/2002 | Warren ................ 280/7.12 |
| 6,708,989 | B1 |   | 3/2004 | Braun |
| 6,983,941 | B1 | * | 1/2006 | Moscaret et al. ........... 280/8 |

(Continued)

*Primary Examiner*—J. Allen Shriver
(74) *Attorney, Agent, or Firm*—Graybeal Jackson Haley LLP (57) ABSTRACT

A ski attachment kit for a kick scooter having a scooter steering assembly that includes a front fork configured for attaching a front wheel, a scooter body that includes a stand-on area and a rear fork rearward of the stand-on area configured for attaching a rear wheel, and a coupling that couples the steering assembly and the scooter body. The kit includes a front ski assembly having a scooter steering assembly mount that receives and releasably retains the steering assembly while providing a clearance for an attached front wheel. The kit also includes a rear ski assembly having a scooter body mount that receives and releasably retains the scooter body while providing a clearance for an attached rear wheel.

18 Claims, 6 Drawing Sheets

U.S. PATENT DOCUMENTS

| | | | |
|---|---|---|---|
| 2001/0005069 A1* | 6/2001 | Soo | 280/7.12 |
| 2002/0043774 A1* | 4/2002 | Chou | 280/7.12 |
| 2002/0109314 A1* | 8/2002 | Chen | 280/14.28 |
| 2002/0121757 A1* | 9/2002 | Louh | 280/87.041 |
| 2003/0067127 A1 | 4/2003 | McClure et al. | |
| 2003/0141682 A1* | 7/2003 | Comden | 280/14.28 |

* cited by examiner

SNAP-ON SKI ATTACHMENT WITH BRAKE FOR KICK SCOOTER

PRIORITY

The present application is a continuation-in-part of and claims priority to U.S. patent application Ser. No. 09/970,381 for SNOWSKATE AND SNOW SCOOTER filed Oct. 2, 2001 now abandoned, which claims priority from U.S. Provisional Patent Application No. 60/237,225 for SNOWSKATE AND SNOW SCOOTER filed Oct. 2, 2000, both of which are incorporated herein by reference for all purposes. The present application also claims priority from U.S. Provisional Patent Application No. 60/461,872, filed Apr. 9, 2003, for BRAKE AND SNAP-ON SKI ATTACHMENTS FOR A KICK SCOOTER, which is incorporated herein by reference for all purposes. The present application also claims priority from U.S. patent application Ser. No. 60/425,222, filed Nov. 8, 2002, for SNAP-ON SKI ATTACHMENTS FOR A KICK SCOOTER, which is incorporated herein by reference for all purposes.

BACKGROUND

The popularity of snowboards has generated increased interest in winter recreation by users of dry land kick scooters and skateboards. The users are often young and not experienced in specific snow sport activities, and further are often not necessarily interested in committing significant money and time to acquire skills necessary to become proficient snowboarders. However, they still want to have a safe and enjoyable experience on the snow. These users (and their parents) want to have an enjoyable snow sliding experience while being able to control speed and stop. An aspect of making such a snow sliding experience readily available is an easy to use brake that does not require significant learning time, and which is not contrary or counter-intuitive with the users' experience on land. There is a need for an easy to use and intuitive foot-activated brake for snow scooters that is readily usable and compatible with existing snow scooter designs.

Another aspect of making a snow sliding experience readily available is an economical and commonly available snow scooter platform for snow sliding. Kick scooters are sometimes knows as push scooters. Kick scooters, such as the RAZOR©, are commonly available and economical, but cannot be used for snow sliding without significant effort converting from wheels to skis. As used herein, a kick scooter typically is a steerable, wheeled scooter with a low center of gravity and having a stand-on area where the rider/user places their feet. A kick scooter may be propelled by the rider standing on the scooter with one foot and using the other foot to "kick" against the pavement and propel the scooter. Kick scooters are commonly stopped or slowed by a user activating a brake by applying a downward force with their foot to a rear-mounted user engagement surface. Presently, ski attachments for wheeled kick scooters exist. However, they require hand tools for attachment as well as the removal of kick scooter components, namely the wheels. In addition, the presently available ski attachments do not have an effective brake, one that is not contrary or counter-intuitive with the users' experience on land of activating a rear-mounted brake engagement surface. There is a need for a ski attachment kit that converts a kick scooter into a snow scooter configuration without removing any kick scooter components, and that also provides an easy-to-use brake functionally similar to a brake on a kick scooter.

SUMMARY

An aspect of the present invention provides a ski attachment kit for a kick scooter with ski attachments that are designed specifically for ease of use and are simply snapped on/off. Such a snap on/off design allows users, specifically children, to easily and quickly affix and remove the ski attachments in seconds without assistance.

A further aspect of the present invention provides a large, pivoting, spring-loaded foot brake integrated into the rear ski attachment that allows users to effectively moderate speed and to control the device on a variety of terrain conditions. The foot brake and its ability to moderate speed allow users of all age groups, including those not experienced in specific snow sport activities, to use the device with confidence and ease. When applied, the brake structure pivots down behind the location for the rear wheel (whether or not the wheel is present) into the snow behind the rear ski.

An embodiment of the present invention provides a ski attachment kit for a kick scooter having a scooter steering assembly that includes a front fork configured for attaching a front wheel, a scooter body that includes a stand-on area and a rear fork rearward of the stand-on area configured for attaching a rear wheel, and a coupling that couples the steering assembly and the scooter body. The kit includes a front ski assembly having a scooter steering assembly mount that receives and releasably retains the steering assembly while providing a clearance for an attached front wheel. The kit also includes a rear ski assembly having a scooter body mount that receives and releasably retains the scooter body while providing a clearance for an attached rear wheel. The scooter steering assembly mount may include two front fork receiving arms that cooperatively have a first spaced-apart configuration that receives the front fork, and when released from the first configuration, cooperatively move to a second configuration that retains the front fork. The scooter body mount may include at least one retaining member configured to releasably mount the rear ski assembly with the scooter body. The scooter body may further include a first mating surface, and the scooter body mount may include a second mating surface configured to mate with the first mating surface. The scooter body mount may include at least one retaining member configured to releasably engage and retain the rear fork of the scooter.

Another embodiment of the invention provides a foot-operated brake for a kick scooter converted for sliding on snow by attaching at least one ski having an elongated glide plate, and a tip portion and a tail portion separated by a central portion having a scooter mount. The brake includes a brake guide coupled to the ski, and a brake coupled to the brake guide and including a user engagement surface that receives a force applied by a foot of a user and a brake plate that engages snow when activated by the force. The brake guide may include a pivot, and the brake is pivotally coupled to the pivot, such that the force applied to the engagement surface pivots the brake about the pivot. The brake guide may be coupled to the ski proximate to the tail portion of the ski. The brake may further include a configuration for trailing engagement with snow. The brake may further include a snow displacement surface configured such that, when the ski moves across a snow surface in a tip-first manner and the braking plate engages snow, the snow displacement surface displaces engaged snow into air space above the snow surface. The brake may further include an elastic member disposed between the glide plate and the brake, the elastic member biasing the braking plate in an elevated position and away from the snow when the glide plate is proximate to the snow until depressed with a force that overcomes the elastic member allowing the braking plate to pivot downwardly and protrude into the snow.

These and various other features as well as advantages of the present invention will be apparent from a reading of the following detailed description and a review of the associated drawings.

BRIEF DESCRIPTION OF THE DRAWINGS

The features of the present invention which are believed to be novel are set forth with particularity in the appended claims. Aspects of the invention, together with further objects and advantages thereof, may best be understood by making reference to the following description taken in conjunction with the accompanying drawings, in the several figures of which like referenced numerals identify like elements, and wherein:

DETAILED DESCRIPTION

In the following detailed description of exemplary embodiments of the invention, reference is made to the accompanying drawings, which form a part hereof. The detailed description and the drawings illustrate specific exemplary embodiments by which the invention may be practiced. It is understood that other embodiments may be utilized, and other changes may be made, without departing from the spirit or scope of the present invention. The following detailed description is therefore not to be taken in a limiting sense, and the scope of the present invention is defined by the appended claims.

Figure 1:
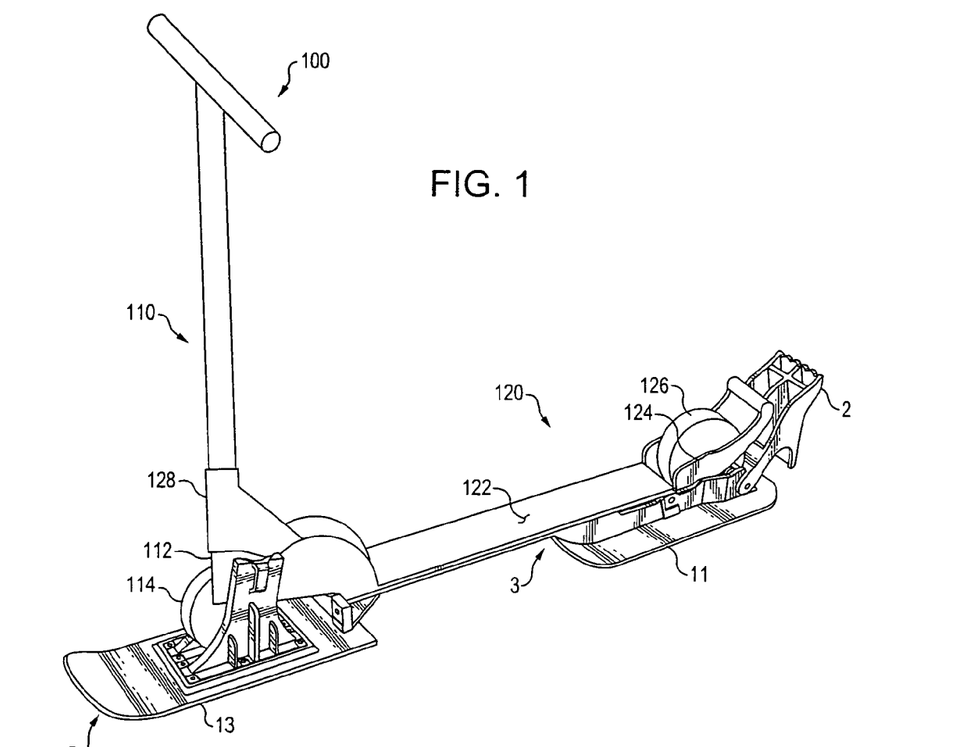
FIG. 1 illustrates a ski attachment kit for a kick scooter, according to an embodiment of the invention.

FIG. 1 illustrates a ski attachment kit 130 for a kick scooter 100, according to an embodiment of the invention. The kick scooter 100 may be any type or form of kick scooter, such as the RAZOR©, having a steering assembly 110 that includes a front fork 112 configured for attaching a front wheel 114. The kick scooter 100 also includes a scooter body that includes stand-on area 122, a rear fork 124, and a rear wheel 126. The kick scooter further includes a coupling 128 that couples the steering assembly 110 to the scooter body 120. The ski attachment kit 130 includes a front ski assembly 5 having front ski 13, and a rear ski assembly 3 having rear ski 11 and a foot brake 2.

Figure 2:
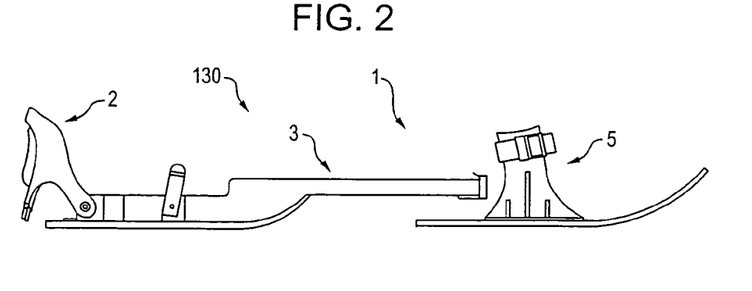
FIGS. 2 and 3 illustrate aspects of the front and rear ski assemblies and of the ski attachment kit of FIG. 1, according to an embodiment of the invention.
Figure 3:
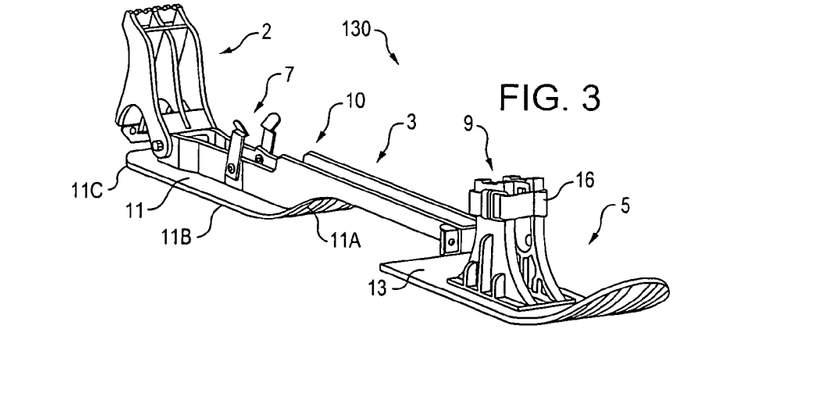

FIGS. 2 and 3 illustrate aspects of the front and rear ski assemblies 3 and of the ski attachment kit 130, according to an embodiment of the invention. FIG. 2 illustrates an embodiment of the ski attachment kit 130 for kick scooters 100 in accordance with an aspect of the present invention that comprises a front ski assembly 5, a rear ski assembly 3, and a foot brake 2. As shown in FIG. 3, the front ski assembly 5 contains a front ski 13, a scooter steering assembly mount 9 illustrated as two opposed front fork receiving arms, and a fixatable member 16 illustrated as support strap 16. FIG. 3 also illustrates the rear ski assembly 3 including the rear ski 11, and a scooter body mount 10, and the foot brake assembly 2.

Figure 4:
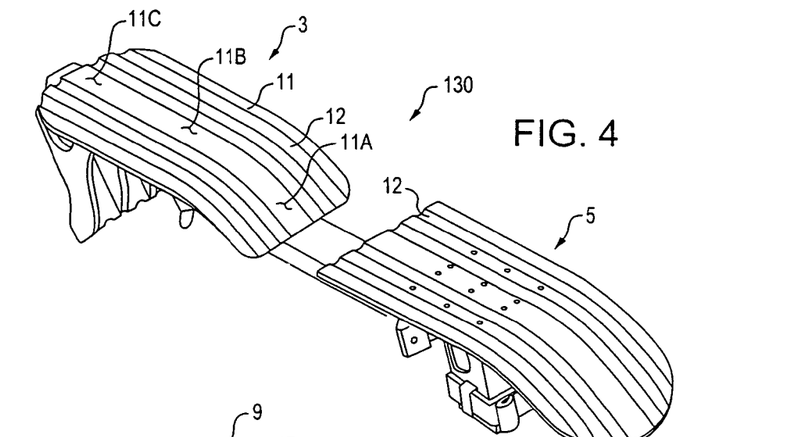
FIG. 4 illustrates the underside of the ski attachment kit of FIG. 1 including the front ski assembly and rear ski assembly, according to an embodiment of the invention.
Figure 5:
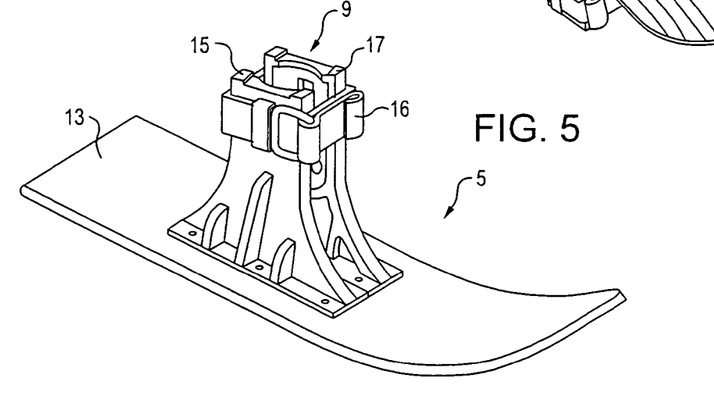
FIGS. 5–9 illustrate aspects of the front ski assembly of the ski attachment kit of FIG. 1, according to an embodiment of the invention.

FIG. 4 illustrates the underside of the ski attachment kit 130 including the front ski assembly 5 and rear ski assembly 3, according to an embodiment of the invention. Guide grooves 12 are formed into the underside of the skis 11 and 13. The guide grooves 12 aid tracking the device when in use, both when traveling in a straight path and turning. FIG. 4 further illustrates a tip portion 11A, an elongated glide plate 11B, and a tail portion 11C of the rear ski 11.

FIGS. 5–9 illustrate aspects of the front ski assembly 5 of the ski attachment kit 130, according to an embodiment of the invention. As shown in the embodiment illustrated in FIG. 5, the front ski assembly 5 is designed to be plastic injection molded (excluding hardware) as three separate components. The three components are the front ski 13, and a right front fork arm 15 and a left front fork arm 17 comprising the scooter steering assembly mount 9.

Figure 6:
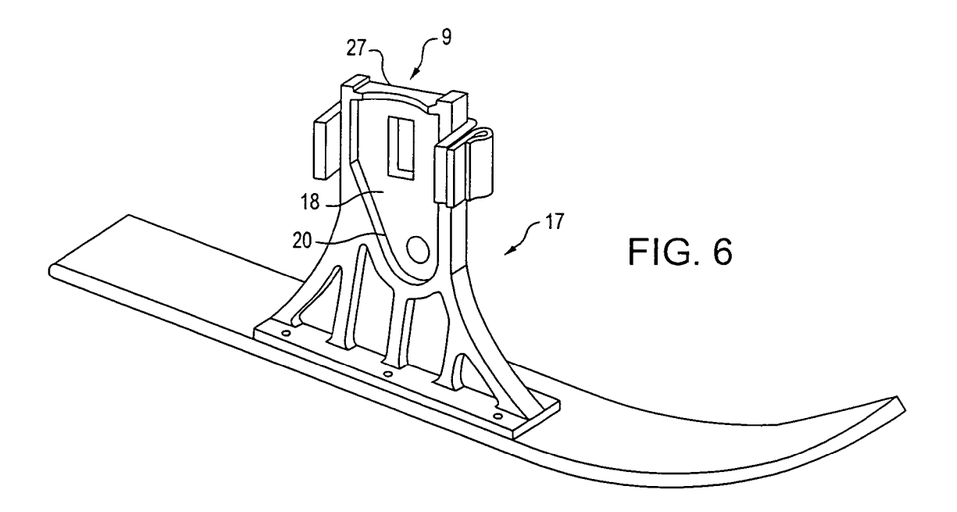

FIGS. 6–9 illustrate details of the scooter steering assembly mount 9, including the right front fork arm 15 and the left front fork arm 17, according to an embodiment of the invention. FIG. 6, is a medial cross section view of the front ski assembly 5, and illustrates the left front fork arm 17. The right front fork is not shown. It is a mirror image of the shown left front fork. Also shown in FIG. 6 are the left fork recess 18, the left fork support surface 20, and the clearance groove 27. The front fork receiving arms 15 and 17 cooperatively have a first spaced apart configuration that receives the front fork 112, and when released from the first configuration, cooperatively and elastically move to a second configuration that retains the front fork. The scooter steering assembly mount 9 provides clearance for an attached front wheel 114, thus the scooter 100 may be attached to the mount 9 either with or without the front wheel 114 attached to the front fork 112.

Figures 7, 8, 9, 10:
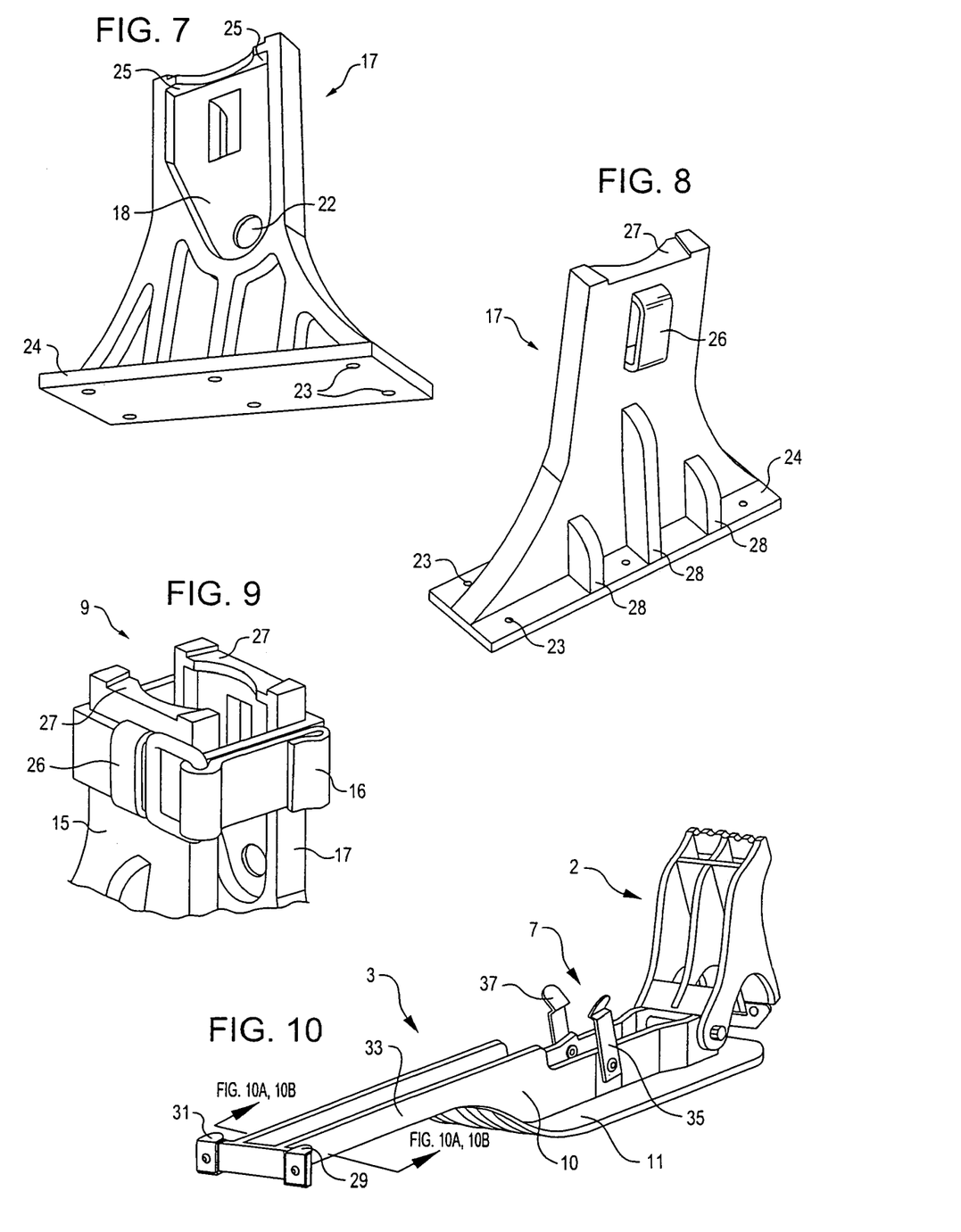
FIGS. 10–16 illustrate aspects of the rear ski assembly and the brake of the ski attachment kit of FIG. 1, according to an embodiment of the invention.

FIG. 7, a medial view of the left front fork arm 17, illustrates the front fork locking fingers 25, the fork bolt recess 22, front fork arm base plate 24, front fork arm attachment holes 23 (for clarity, only two of which are numbered), and left fork recess 18. The front ski 13 is attached to the fork arms with fasteners applied through the attachment holes 23.

FIG. 8, a lateral view of the left front fork arm 17, illustrates the support strap detent 26 and front fork arm stiffener ribs 28 (left side only shown), as well as the front fork arm attachment holes 23 and the front fork arm base plate 24. FIG. 9 includes a detailed view of the upper portion of the front fork arms 15 and 17, and a fixatable member 16. The fixatable member 16 is configured such that, when fixated, it inhibits movement of the two opposing front fork receiving arms 15 and 17 from the second configuration to the first configuration. The fixatable member is illustrated as support strap 16, which is a separate part. The support strap 16 utilizes pieces of hook-and-loop to mechanically fasten to itself through a "D"-ring. FIG. 9 illustrates the support strap 16 threaded through the support strap detent 26, the clearance grooves 27, right front fork arm 15, and left front fork arm 17.

When the front fork 112 and wheel 114 of the kick scooter 100 (not shown) are inserted into the front ski assembly 5, the front fork arms 15 and 17 bend elastically outwards to accommodate their width. When seated into position, the fork arms 15 and 17 then elastically "snap" back into place, thereby receiving and releasably retaining the front fork 112 while providing a clearance for an attached front wheel 114. The support strap 16 is then threaded through its "D"-ring and affixed to itself via pieces of hook-and-loop material. The left fork support surface 20 and the right fork support surface, not shown, both bear the partial weight of the kick scooter and rider as well as prevent the front ski assembly 5 from rotating about the front fork 112. The front fork locking fingers 25 prevent the front ski assembly from detaching while in use, yet still allow for its intentional removal. The clearance grooves 27, left fork recess 18 and fork bolt recesses 22 (as well as the right fork recess and fork bolt recess, although not shown) prevent interference of the kick scooter's parts. The support strap 16 provides a degree of additional assurance that the front ski assembly 5 will not errantly detach from the kick scooter during use. In another embodiment, a combination of the support strap 16 and the front fork receiving arms 15 and 17 act as a gripping member that compressively and releasably grips a portion of the scooter steering assembly, such as the fork 112. In a further embodiment, the scooter steering assembly mount 9 includes a member (not shown) that receives and releasably retains a front wheel 114 attached to the front fork 112.

FIGS. 10–16 illustrate aspects of the rear ski assembly 3 of the ski attachment kit 130 and the brake 2, according to an embodiment of the invention. FIG. 10 illustrates the rear ski assembly 3 including the rear ski 11, a scooter body mount 10, and the foot brake assembly 2. The scooter body mount 10 includes configuration to releasably mount and retain the rear ski assembly 3 to the scooter body 130, while providing clearance for a rear wheel 126 attached to a rear fork 124. In an embodiment illustrated in FIG. 10, the scooter body mount 10 includes a deck support 33, rear fork retaining arms 7 (including the left rear fork arm 35 and right rear fork arm 37), left retainer clip 29, and right retainer clip 31. The rear ski assembly 3 is also designed to be plastic injection molded as a single unit (excluding hardware).

Figures 10A, 10B, 11, 12, 13:
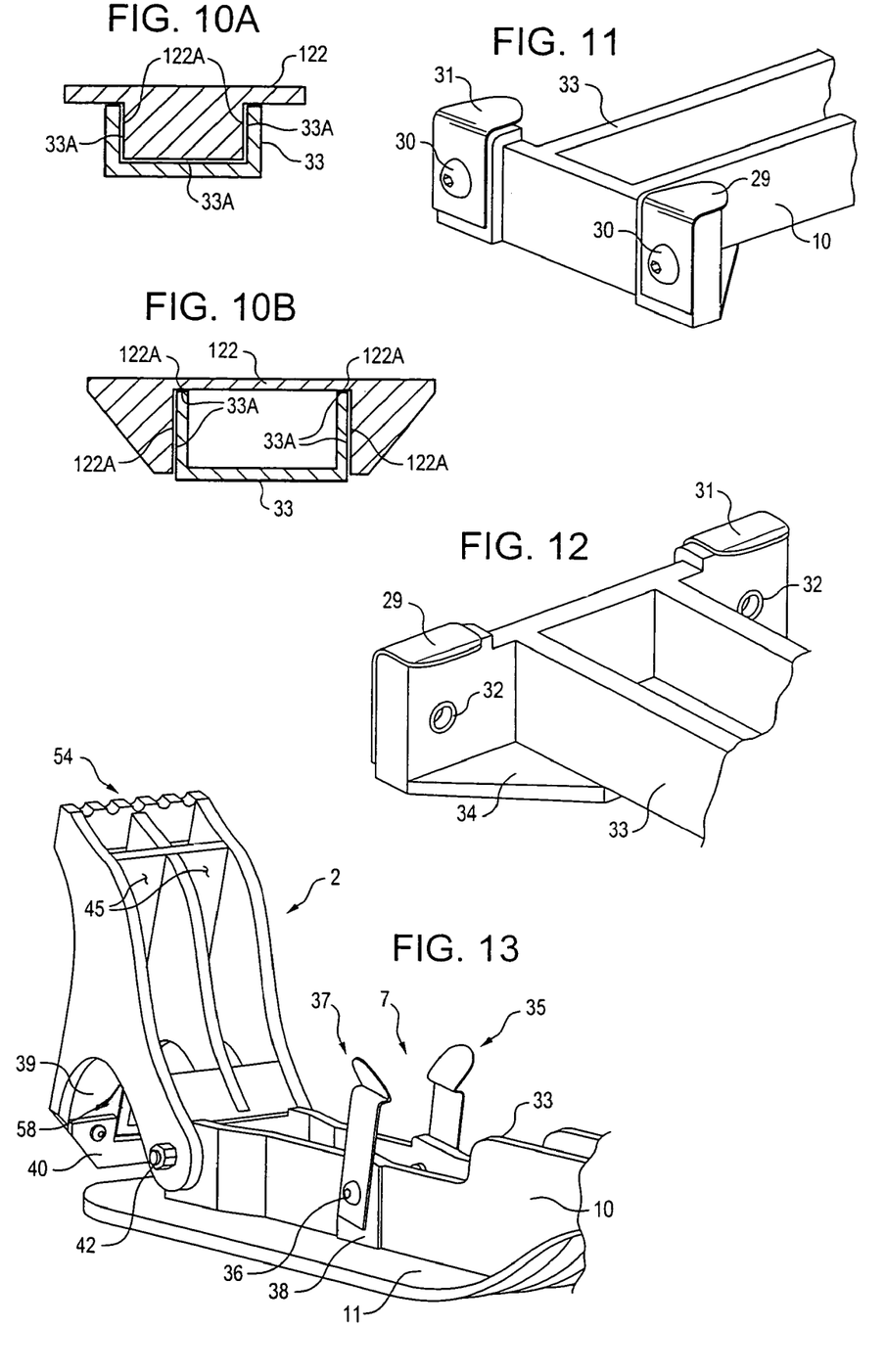

The scooter body mount 10 includes at least one retaining member configured to releasably mount the rear ski assembly 3 to the scooter body 120. FIG. 10A illustrates a cross-sectional view that includes an embodiment of the scooter body mount 10 retaining member having a female first mating surface 33A formed in the deck support 33. The first mating surface 33A includes a configuration that mates with a male second mating surface 122A formed in an underside portion of the stand-on area 122 of the scooter body 120. The second mating surface 122A of a channel in the underside of the stand-on portion 122 mates with the first mating surface 33A of the deck support 33 to both stabilize and prevent any lateral movement of the rear ski assembly 3 when attached to the kick scooter 100. The mating surfaces 33A and 122A of the scooter body mount 10 and the scooter body 120 respectively may be arranged in any manner that provides a mating engagement. FIG. 10B illustrates a cross-sectional view of another embodiment of the scooter body mount 10 retaining member having a male first mating surface 33A that mates with a female second mating surface 122A of a channel in the underside of the stand-on area 122.

FIG. 11 illustrates a front portion of the rear ski assembly 3 that includes a scooter body mount having at least one retaining member configured to releasably engage the scooter body 120. The retaining member includes retaining clips 29 and 31. The deck support 33, left retainer clip 29, right retainer clip 31, and retainer clip fasteners 30 are shown. The left and right retainer clips 29, 31 are designed to be user-replaceable by removal of the retainer clip fasteners 30. Left and right retainer clips 29, 31 are manufactured from corrosion-resistant metal. The retainer clips 29 and 31 are arranged in opposition to the deck support 33, and configured to engage a front portion of the stand-on area 122 and resist longitudinal movement of the scooter body with respect to the rear ski assembly 3.

FIG. 12 is a rear perspective view of a front portion of the rear ski assembly 3. Here, the threaded inserts 32 and support gusset 34 are shown, in addition to the deck support 33, left retainer clip 29, and right retainer clip 31. The support gusset 34 strengthens the front portion of the rear ski assembly 3, while the threaded inserts 32 allow the retainer clip fasteners 30 to be user-replaceable and maintain firm attachment of the left and right retainer clips 29, 31 to the rear ski assembly 3.

FIG. 13 illustrates the foot brake assembly 2, and the rear portion of the rear ski assembly 3 and scooter body mount 10 in further detail. The brake assembly 2 includes a brake plate 39, a replaceable brake wear plate 40, a foot brake pivot bolt assembly 42, a snow displacement surface 45, user foot engagement surface 54 (illustrated as including a serrated configuration), and left and right foot brake pivot arms 58. The brake assembly also includes reinforcing ribs (not numbered) providing a structural rigidity. The scooter mount 10 includes rear fork arm fasteners 36 (right side shown only), and rear fork arm support boss 38 (right side shown only) are visible, as well as the rear fork retaining arms 7, rear ski 11, and deck support 33. The rear fork retaining arms 7 are designed to be user-replaceable by removal of the rear fork arm fasteners 36. The rear fork retaining arms 7 (including the left rear fork arm 35 and right rear fork arm 37) are manufactured from corrosion-resistant metal. The rear fork retaining arms 7 securely attach the rear ski assembly 3 to the kick scooter (not shown) and also prevent the kick scooter from sliding backwards out of the left and right retainer clips 29, 31. The rear fork arm support bosses 38 are designed to prevent the rear fork retaining arms 7 from rotating. Threaded inserts 32 (not shown in FIG. 13) allow the rear fork arm fasteners 36 to be user-replaceable and maintain firm attachment of the left and right rear fork retaining arms 35, 37 to the rear ski assembly 3.

The scooter body mount 10 includes at least one retaining member 7 configured to releasably engage and retain the rear fork 124 of the scooter 100. The embodiment of the retaining member 7 illustrated includes two retaining arms 35 and 37 cooperatively having an elastic first spaced-apart configuration that receives the rear fork 124, and when released from the first configuration, cooperatively and elastically move to a second configuration that retains the rear fork. In an alternative embodiment, the scooter body mount 10 includes at least one member (not shown) that receives and releasably retains a rear wheel attached to the rear fork. In another alternative embodiment, the scooter body mount includes a gripping member (not shown) that compressively and releasably grips a portion of the scooter body. For example, the gripping member may be a fixatable member similar to the support strap 16 of FIG. 9 that is then threaded through a "D"-ring and affixed to itself via pieces of hook-and-loop material.

Figure 14:
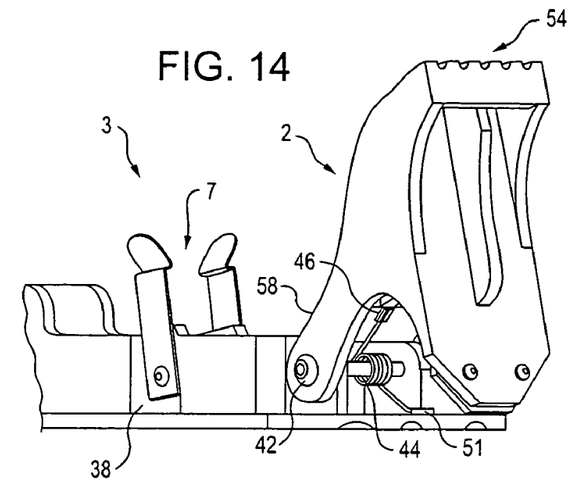

FIG. 14 illustrates another perspective of the rear portion of the rear ski assembly 3, including the foot brake assembly 2. FIG. 14 illustrates an elastic member, shown as foot brake spring 44, an upper spring detent 46, and a lower spring detent 51, as well as a foot brake pivot bolt assembly 42, a rear fork arm support boss 38 (left side shown only), and a rear fork retaining arms 7. The upper and lower spring detents 46, 51 are molded into the foot brake assembly 2 and rear ski assembly 3, respectively, and prevent lateral movement of the foot brake spring 44. FIGS. 13 and 14 also illustrate a user engagement surface 54 and a snow displacement surface 45.

To attach the rear ski assembly 3 to the kick scooter 100 (not shown), the kick scooter is inserted at an angle into the left and right retainer clips 29, 31 so that the deck support 33 is centered in the pre-existing channel underneath the stand-on area 122 (or deck) of the kick scooter. The rear fork retaining arms 7 are then pressed outwards with the operators fingers (or thumbs) and the kick scooter 100 is allowed to drop into place, resting on the deck support 33 with the first and second mating surfaces 33A and 122A in proximity to each other. The rear fork retaining arms 7 then "snap" back into place, effectively locking the rear ski assembly 3 to the kick scooter. A snap on/off design such as that presented here will allow users, specifically young users, to easily affix and remove the ski attachments in seconds without assistance.

Figure 15:
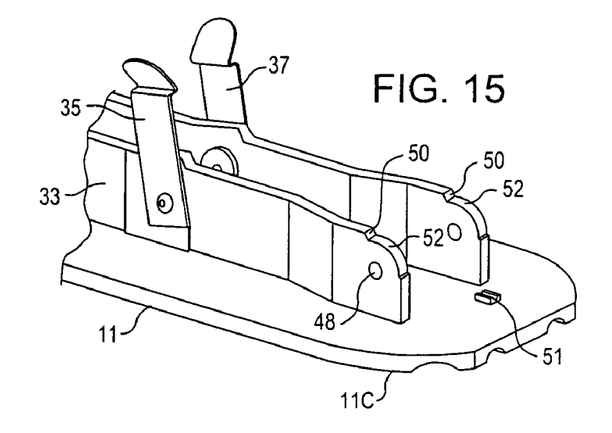

FIG. 15 illustrates the rear portion of the rear ski attachment 3 with the foot brake assembly 2 removed. FIG. 15 illustrates a foot brake guide that includes a pivot coupled to the deck support 33, which is in turn coupled to the rear ski 11. An embodiment of the pivot includes pivot stops 50 (both left and right), pivot recesses 52 (both left and right), and pivot bolt holes 48 (for clarity, only the left side is numbered), as well as the lower spring detent 51, left rear fork retaining arm 35, and right rear fork retaining arm 37. During use, the foot brake pivot stops 50 contact the foot brake pivot stop plate 56 (shown in FIG. 16) to halt the foot brake assembly 2 as it is forced to return to its upper, resting position by the foot brake spring 44. The pivot recesses 52 allow clearance for the foot brake pivot stop plate 56. In another embodiment, the foot brake guide may be a longitudinal channel through which the foot brake assembly moves against snow linearly instead of pivotally.

As further illustrated in FIG. 15, coupling the foot brake guide proximate to the tail 11C of the ski 11 allows the braking plate 39 to trailing engage the snow behind the ski. This trailing configuration limits directional disruption caused by application of the brake 2, and eliminates a requirement for an opening in the glide surface 11B for movement of the braking plate 39 to engage the snow.

Figure 16:
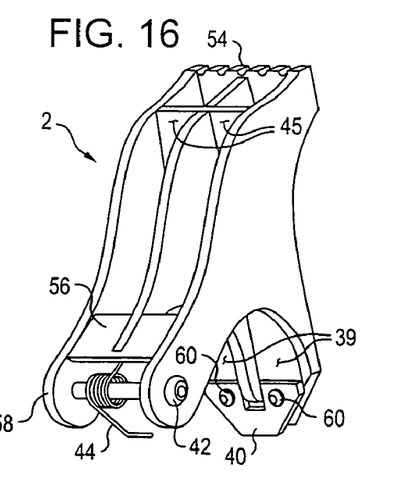

The foot brake assembly 2 shown in FIG. 16 is removed from the rear ski assembly 3, and is also designed to be plastic injection molded as a single unit (excluding hardware). FIG. 16 illustrates the foot brake pivot stop plate 56, the serrated user foot engagement surface 54, foot brake pivot arms 58 (for clarity, only the right side is numbered), and the foot brake wear plate fasteners 60 fixating the brake wear plate 40 to the brake plate 39. Also shown are the foot brake plate 39 which provides primarily a snow resistive braking surface, a foot brake pivot bolt assembly 42, and an elastic member 44 illustrated as a foot brake spring 44. The serrated user foot engagement plate 54 is designed to minimize slipping of the user's foot during engagement of the foot brake 2.

In use, the brake 2 receives a force applied by a foot of a user at the user engagement surface 54. The application of the force pivotally activates the brake 2 and transfers the force to the braking plate 39 causing the braking plate and the wear plate 40 to engage snow. When force is applied, the rear brake structure pivots down behind the location for the rear wheel 126 (whether or not the wheel is present) into the snow behind the rear ski 11. A substantial portion of braking force generated by the brake 2 is resistance to the braking plate 39 moving through snow. A lesser braking force may be provided by surface friction between a surface of the braking plate 39 and a snow surface. Such friction could typically be caused by a lower edge of the wear plate 40 rubbing against a snow or ice surface. The snow displacement surface 45 is configured such that, when the rear ski assembly 3 moves across a snow surface in a tip-first manner and the braking plate 39 engages snow, the snow displacement surface 45 displaces engaged snow into air space above the snow surface. The snow clearing function performed by the snow displacement surface 45 limits snow buildup against the braking plate that may otherwise reduce braking. The snow displacement surface 45 may be configured to displace engaged snow into the air in a "rooster tail" manner.

When the elastic member is used, such as the foot brake spring 44 disposed between the rear ski assembly 3 and the brake 2, the elastic member biases the braking plate 39 in an elevated position and away from the snow when the rear ski assembly is proximate to the snow. When the brake 2 is depressed by the user's foot applied to the foot-engagement plate 54 with a force that overcomes the elastic member, the elastic member allows the braking plate 39 to pivot downwardly and protrude into the snow. Upon release of the depressive force, the elastic member biases the braking plate 39 back to the elevated position.

The large, pivoting, spring-loaded foot brake 2 integrated into the rear ski assembly 3 allows users to effectively moderate speed and to control the converted kick scooter on a variety of terrain conditions. The foot brake 2 and its ability to moderate speed allow users of all age groups, including those not experienced in specific snow sport activities, to use the slide on snow with confidence and ease.

Figure 17:
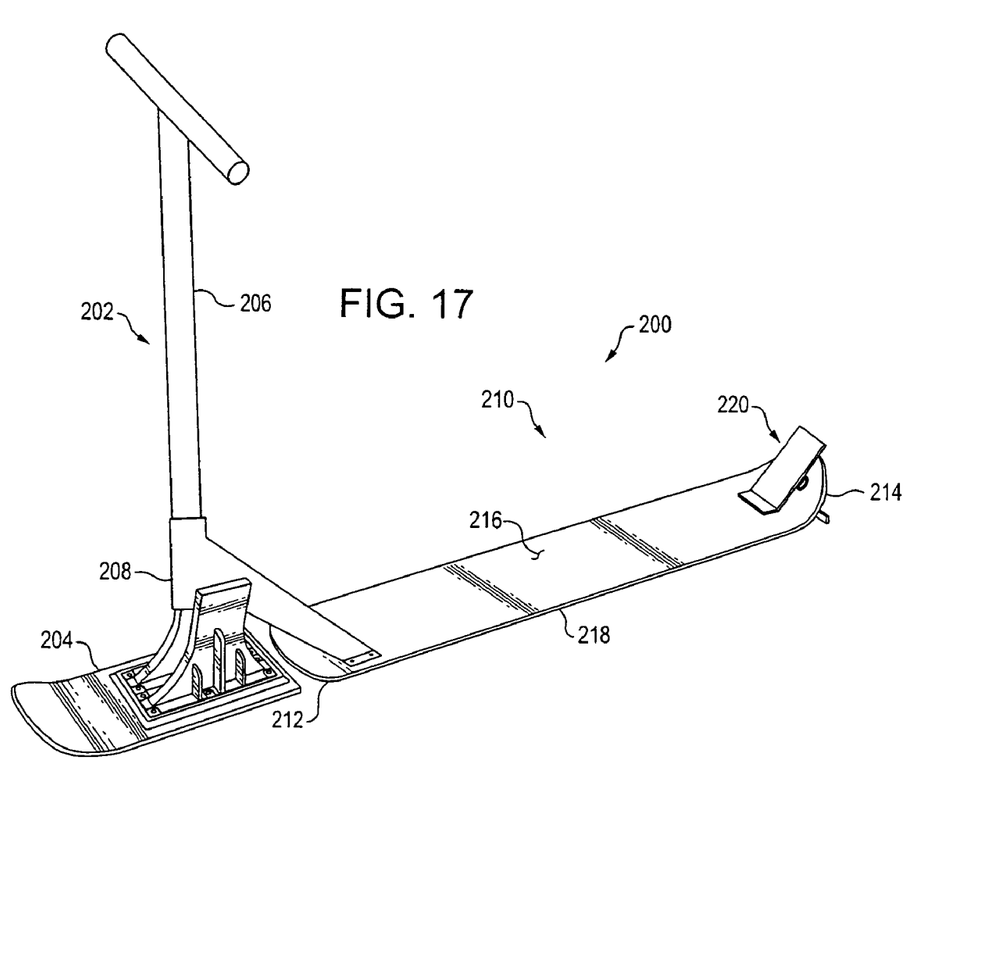
FIG. 17 is a perspective view improved snow scooter having a trailing brake, according to an embodiment of the invention.

FIG. 17 is a perspective view improved snow scooter 200 having a trailing brake 220, according to an embodiment of the invention. The snow scooter 200 includes a front ski assembly 202 and a scooter body 210. The front ski assembly includes a front tip 204, and a steering handle 206. The scooter body 210 includes a tip portion 212 and a tail portion 214 joined by a stand-on portion 216, and a snow gliding surface 218 having a flat portion defining a plane. A trailing brake 220 is mounted to the snow scooter body 210 proximate to the tail portion 214. The scooter body 210 and the front ski assembly 202 are coupled together by a rotatable coupling 208. In the embodiment illustrated in FIG. 17, the tail portion 214 upturns away from the gliding surface 218. In an alternative embodiment, the improved snow scooter 200 includes only the scooter body 210 with the steering handle 206 coupled thereto.

Figure 18:
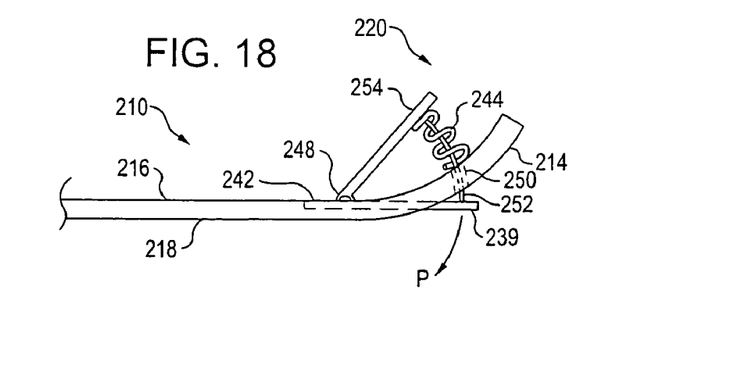
FIG. 18 is a side view of the trailing brake of the snow scooter of FIG. 17 in an elevated or retracted position, according to an embodiment of the invention.

FIG. 18 is a side view of the trailing brake 220 of the snow scooter 200 of FIG. 17 in an elevated or retracted position, according to an embodiment of the invention. The brake 220 includes a brake guide 242 having a pivot 248, a user engagement surface 254, a brake plate 239, an optional braking force transfer member 252, and an optional elastic member 244. The scooter body 210 additionally includes a transfer member aperture 250, and a brake plate aperture (not shown).

The brake 220 may have any configuration that provides a pivoting, trailing brake with a plate that engages snow. As illustrated in FIG. 18, the brake 220 includes two surfaces, the user engagement surface 254 and the brake plate 239, which are coupled together in a "V" configuration at a pivot portion that engages the pivot 248. If additional structure is necessary for transfer of a force from the engagement surface 254 to the brake plate 239, the optional braking force transfer member 252 may be used. In a further alternative embodiment, the brake plate 239 may be connected to the user engagement surface 254, which in turn is connected to a pivot point that engages the pivot 248.

The brake guide 239 is coupled to the scooter body 210 at a rear portion of the stand-on area 216, or at the tail portion 214. The brake guide 242 may have any structure appropriate for guiding the trailing brake 220. In the embodiment illustrated in FIG. 18, the brake guide 242 includes a plate mountable to the scooter body 210, optionally in a recess, and having a pivot 248 that may be similar to the pivot illustrated in FIG. 15. The brake plate aperture (not shown) in the scooter body 210 may be any shape of aperture appropriate for the brake plate 239 to pivot about the pivot 248 and trailingly engage snow under the gliding surface 218. The transfer member aperture 250 may be formed at a location and with a configuration allowing the transfer member 252 to couple the brake plate 239 and the engagement surface 254.

In use, the user stands on the stand-on portion 216 and rides the snow scooter 200. In a normal riding configuration, the brake plate 239 is in an elevated position at least at or preferably above the plane of the gliding surface 218. To slow or stop the snow scooter 200, the user places a portion of one of their feet on the engagement surface 254 and applies a generally downward force. The downward force activates the brake 220 by pivoting it around the pivot 248 and moving the brake plate 239 in a direction P to engage snow under the gliding surface 218.

If the optional elastic member 244 is disposed between the gliding surface 218 and the brake 220, the elastic member is configured to bias the brake plate 239 in an elevated position and away from the snow when the gliding surface 218 is proximate to the snow until depressed with a force that overcomes the elastic member allowing the braking plate to pivot downwardly in the direction P and protrude into the snow. In an embodiment, the elastic member includes a spring. In a further embodiment, the brake plate 239 protrudes below the plane of the gliding surface 218 in an orientation generally transverse to the longitudinal axis of the scooter body 210. In another alternative embodiment, the brake 220 further includes a snow displacement surface (not shown) configured such that, when the scooter moves across a snow surface in a tip-first direction generally aligned with the longitudinal axis and the braking plate engages snow, the snow displacement surface displaces engaged snow into air space above the snow surface.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims hereinafter appended.

What is claimed is:

1. A ski attachment with a foot-operated brake for converting a wheeled kick scooter for sliding on snow, comprising:
    a ski having a scooter mount and an elongated glide plate having a width, a forward tip portion, and a rearward tail portion;
    a brake guide coupled to the ski; and
    a brake coupled to the brake guide and including a user engagement surface that receives a force applied by a foot of a user and a brake plate having a width substantially equal to the width of the glide plate that initially engages snow behind the tail portion of the ski when activated by the force.

2. The ski with brake of claim 1, wherein the brake guide comprises a pivot, and the brake is pivotally coupled to the pivot, such that the force applied to the engagement surface pivots the brake about the pivot.

3. The ski with brake of claim 1, wherein the brake guide is coupled to the ski proximate to the tail portion of the ski.

4. The ski with brake of claim 1, wherein the brake guide is coupled to a tail portion of the scooter mount.

5. The ski with brake of claim 1, wherein the brake further includes a configuration for trailing engagement with snow.

6. The ski with brake of claim 1, wherein the brake further includes a snow displacement surface configured such that, when the ski moves across a snow surface in a tip-first manner and the braking plate engages snow, the snow displacement surface displaces engaged snow into air space above the snow surface.

7. The ski with brake of claim 1, further including an elastic member disposed between the glide plate and the brake, the elastic member biasing the brake plate in an elevated position and away from the snow when the glide plate is proximate to the snow, until depressed with a force that overcomes the elastic member allowing the brake plate to pivot downwardly and protrude into the snow.

8. The ski with brake of claim 7, wherein the elastic member comprises a spring.

9. The ski with brake of claim 1, wherein the brake guide is coupled to a tail portion of the scooter mount.

10. A snap-on ski attachment with a foot-operated brake for converting a wheeled kick scooter for sliding on snow, comprising:
    a ski having an elongated glide plate having a width, a forward tip portion, and a rearward tail portion;
    a brake guide coupled to the ski;
    a brake coupled to the brake guide and including a user engagement surface that receives a force applied by a foot of a user and a brake plate that engages snow activated by the force;
    at least one forward retaining clip that retains a forward portion of the ski to the scooter; and
    at least one rear retaining clip that retains a rearward portion of the ski to the scooter;
    where at least one of the at least one forward retaining clip and the at least one rearward retaining clip includes an elastic element that snaps into retaining engagement when the ski is applied to a scooter.

11. The ski with brake of claim 10 having two rear retaining clips and both rear retaining clips include elastic elements that snap into retaining engagement when the ski is applied to a scooter.

12. The ski with brake of claim 11 where the rear retaining clips are made of springy metal.

13. The ski with brake of claim 12 where the forward retaining clips are made of metal.

14. The ski with brake of claim 11 having two forward retaining clips.

15. The ski with brake of claim 10, wherein the brake guide comprises a pivot, and the brake is pivotally coupled to the pivot, such that the force applied to the engagement surface pivots the brake about the pivot.

16. The ski with brake of claim 10, wherein the brake further includes a configuration for engagement with snow behind the tail portion of the ski.

17. The ski with brake of claim 16, wherein the brake further includes a snow displacement surface configured such that, when the ski moves across a snow surface in a tip-first manner and the braking plate engages snow, the snow displacement surface displaces engaged snow into air space above the snow surface.

18. The ski with brake of claim 10, further including a spring disposed between the glide plate and the brake biasing the brake plate in an elevated position and away from the snow when the glide plate is proximate to the snow, until depressed with a force that overcomes the spring allowing the brake plate to pivot downwardly and protrude into the snow.

* * * * *